No. 703,494. Patented July 1, 1902.
M. STANGEL.
WAGON SEAT SUPPORT.
(Application filed Apr. 26, 1902.)
(No Model.)
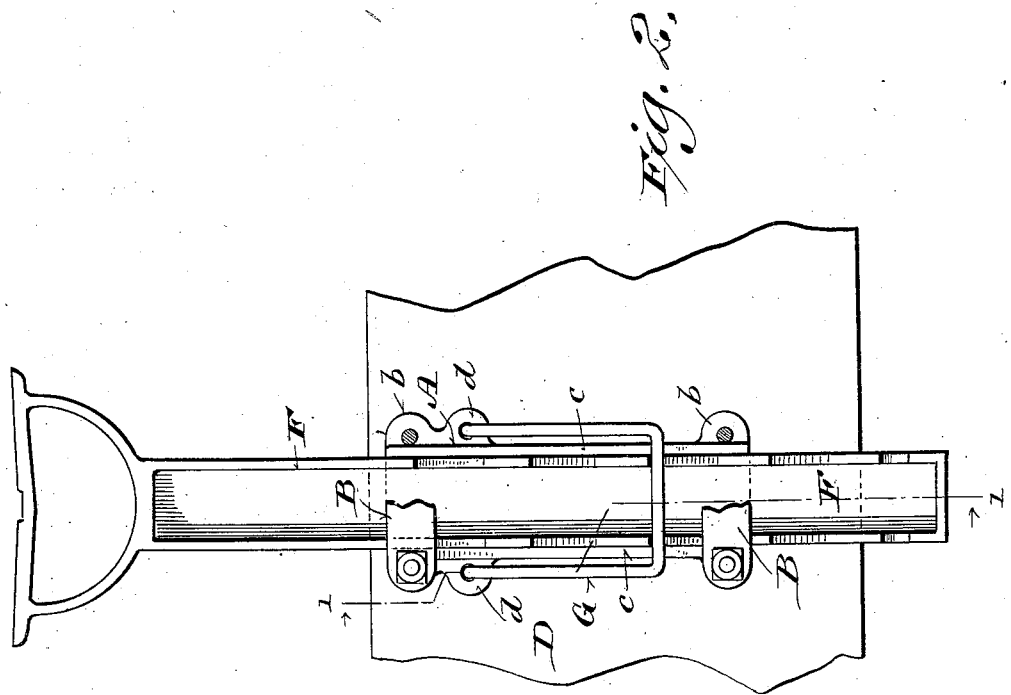
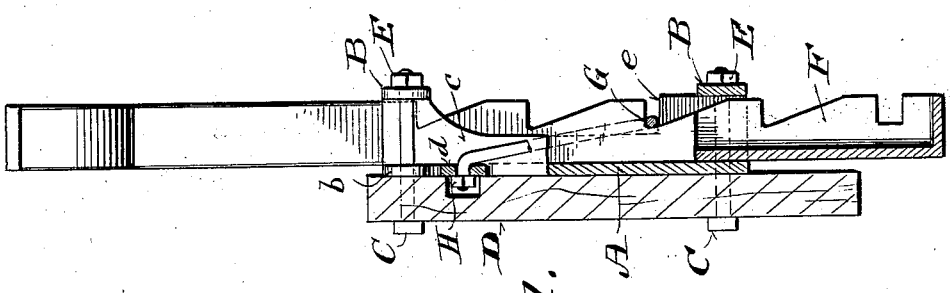
Witnesses
Geo W Young
N. E. Oliphant
Inventor
Martin Stangel,
By H. G. Underwood
Attorney
THE NORRIS PETERS CO., PHOTO-LITHO., WASHINGTON, D. C.

UNITED STATES PATENT OFFICE.

MARTIN STANGEL, OF HALES CORNERS, WISCONSIN.

WAGON-SEAT SUPPORT.

SPECIFICATION forming part of Letters Patent No. 703,494, dated July 1, 1902.

Application filed April 26, 1902. Serial No. 104,750. (No model.)

*To all whom it may concern:*

Be it known that I, MARTIN STANGEL, a citizen of the United States, and a resident of Hales Corners, in the county of Milwaukee and State of Wisconsin, have invented certain new and useful Improvements in Wagon-Seat Supports; and I do hereby declare that the following is a full, clear, and exact description thereof.

The improvements consist in certain peculiarities of construction and combination of parts hereinafter particularly set forth with reference to the accompanying drawings and subsequently claimed, the object of the invention being to provide simple, economical, and vertically-adjustable supports for wagon-seats.

Figure 1 of the drawings represents a partly-sectional front elevation of a seat-support in accordance with my invention attached to a wagon-body side-board, this view being indicated by line 1 1 in the second figure; and Fig. 2 of said drawings represents a side elevation of what is shown in the first figure, some of the parts being broken and in section.

Referring by letter to the drawings, A indicates a flat plate-casting provided with corner-lugs b, a pair of outer parallel longitudinal flanges c, and other lugs d, adjacent to the upper corner-lugs. Abutting the casting-flanges c to extend at their ends beyond the same are bars B, parallel to the corner-lugs b of said casting. Bolts C extend through apertures provided in a wagon-body side-board D, corner-lugs b of casting A, and the ends of bars B, nuts E being run on the bolts to hold the guide comprising said casting and bars in place against the outer side of said wagon-body side-board. Arranged to slide in the guide is a preferably cast-metal rack-standard F, the upper end of which is made to serve as a bolster for a wagon-seat spring, this standard being held in vertically-adjusted position by means of a bail G engaging the same to rest on flange-shoulders e of guide-casting A, offset ends of the bail being extended through apertures in casting-lugs d and engaged with nuts H, for which clearance is had in recesses of the side-board of the wagon-body to permit swing of said bail. Inasmuch as the bail has support on flange-shoulders of the guide-casting A when in working position, the strain that would otherwise come upon said bail is transferred to said casting.

Having thus described my invention, what I claim as new, and desire to secure by Letters Patent, is—

1. The combination of a shouldered guide attachable to a side-board of a wagon-body, a rack-standard vertically adjustable in the guide, the upper end of this standard being made to serve as a bolster for a wagon-seat spring, a bail having offset ends extended through lugs of said guide into clearance-recesses provided in the wagon-body side-board, and means in connection with the bail ends for preventing their withdrawal through said lugs, the bail being adjustable to engage said standard and rest on the guide-shoulders.

2. The combination of a flat plate-casting having a pair of outer parallel longitudinal flanges, flange-abutting bars having their ends provided with apertures in register with apertures in lugs of the casting, bolts engageable with a wagon-body side-board, said lugs and bars; nuts on the bolts, a rack-standard vertically adjustable in the guide comprising said casting and bars, the upper end of this standard being made to serve as a bolster for a wagon-seat spring, a bail having offset screw-threaded ends extended through lugs of the aforesaid casting, and nuts on the bail ends having clearance in recesses provided in the wagon-body side-board, the bail being adjustable to engage the said standard and rest on shoulders of said casting-flanges.

In testimony that I claim the foregoing I have hereunto set my hand, at Milwaukee, in the county of Milwaukee and State of Wisconsin, in the presence of two witnesses.

MARTIN STANGEL.

Witnesses:
N. E. OLIPHANT,
B. C. ROLOFF.